United States Patent
Shaffer et al.

(10) Patent No.: US 7,245,607 B1
(45) Date of Patent: Jul. 17, 2007

(54) APPARATUS AND METHOD FOR TELEPHONY FEATURE ACCESS AND GATEKEEPER POLICY INTERACTION ON COMBINED TOL/PBX SYSTEMS

(75) Inventors: Shmuel Shaffer, Palo Alto, CA (US); William J. Beyda, Cupertino, CA (US); Rudolph Bitzinger, Munich (DE)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/189,112

(22) Filed: Nov. 9, 1998

(51) Int. Cl.
  *H04L 12/66* (2006.01)
(52) U.S. Cl. .................... 370/352; 370/395.2; 370/401; 370/468; 379/165
(58) Field of Classification Search ............... 370/229, 370/230, 235, 351, 352, 360, 401, 402, 447, 370/449, 465, 468, 493, 329, 338, 356, 355, 370/395.2, 395.21, 389; 379/165
  See application file for complete search history.

(56) References Cited

U.S. PATENT DOCUMENTS

| | | | | |
|---|---|---|---|---|
| 5,568,544 A * | 10/1996 | Keeler et al. | ................ | 379/273 |
| 5,610,910 A * | 3/1997 | Focsaneanu et al. | ........ | 370/351 |
| 5,621,728 A * | 4/1997 | Lightfoot et al. | ........... | 370/397 |
| 5,740,075 A * | 4/1998 | Bigham et al. | ............. | 709/229 |
| 6,031,836 A * | 2/2000 | Haserodt | ..................... | 370/389 |
| 6,145,083 A * | 11/2000 | Shaffer et al. | .............. | 713/201 |
| 6,161,134 A * | 12/2000 | Wang et al. | ................. | 709/220 |
| 6,169,738 B1* | 1/2001 | Sriram et al. | ............... | 370/395 |
| 6,185,185 B1* | 2/2001 | Bass et al. | .................. | 370/230 |
| 6,208,640 B1* | 3/2001 | Spell et al. | ................. | 370/358 |
| 6,259,691 B1* | 7/2001 | Naudus | ..................... | 370/352 |
| 6,292,482 B2* | 9/2001 | Pickett | ....................... | 370/352 |
| 6,314,103 B1* | 11/2001 | Medhat et al. | ............. | 370/395 |
| 6,320,857 B1* | 11/2001 | Tonnby et al. | ............. | 370/352 |
| 6,330,244 B1* | 12/2001 | Swartz et al. | .............. | 370/401 |
| 6,377,570 B1* | 4/2002 | Vazirii et al. | ............... | 370/352 |
| 6,411,601 B1* | 6/2002 | Shaffer et al. | ............. | 370/230 |
| 6,430,176 B1* | 8/2002 | Christie, IV | ................ | 370/355 |
| 6,483,835 B1* | 11/2002 | Tanigawa et al. | ...... | 370/395.21 |
| 6,529,499 B1* | 3/2003 | Doshi et al. | ................ | 370/352 |

* cited by examiner

*Primary Examiner*—Seema S. Rao
*Assistant Examiner*—Shick Hom

(57) ABSTRACT

A ToL/PBX system is provided whereby a single policy may be enforced for both TFA (telephony feature access) and ToL (telephony over LAN) users by making the H.323 gatekeeper (103) aware of those TFA connectors so as to accurately allocate the remaining available bandwidth. According to one embodiment of the invention, the H.323 gatekeeper (103) is notified whenever a TFA call is being made or received.

32 Claims, 6 Drawing Sheets

APPARATUS AND METHOD FOR TELEPHONY FEATURE ACCESS AND GATEKEEPER POLICY INTERACTION ON COMBINED TOL/PBX SYSTEMS

BACKGROUND OF THE INVENTION

The present invention relates to telecommunications systems, and in particular, to a combined Telephony-over-Local Area Network (LAN) and Private Branch Exchange (PBX) systems.

Telephony-over-LAN (ToL) systems employing the H.323 protocol for communications are becoming increasingly popular as replacements for PBX-based telephony systems. However, replacement is not typically occurring in a single step. Instead, ToL systems are typically connected to a PBX because companies do not wish to replace an entire phone system overnight. Accordingly, users on the PBX are typically migrated to the ToL system as they develop a need, for example, for advanced collaboration and video applications. In the interim, telephony users on a LAN may be served by an H.323 gatekeeper and may co-exist with telephony users using a digital or analog telephone on the PBX served by the PBX.

In addition, a new class of PBX user, referred to colloquially as "Glass Phones", is emerging. The Glass Phone user device is attached to the LAN, but is typically not H.323 compliant and gets its call-processing functions from the PBX. The Glass Phone user device is typically installed on the LAN either for wiring convenience or to allow use of PC Glass Phone software which has a convenient user interface, or to avoid the expense of purchasing a separate phone for someone who already has a personal computer.

The Glass Phone feature, also known as Telephony Feature Access (TFA), has evolved over the last few years before ToL systems, and as such, when a ToL system is connected there may already be some TFA users on the LAN. Prior to ToL systems being introduced, Glass Phone calls were assumed to be the only real-time traffic on the LAN and did not need to report to any policy authority other than the TFA gateway in the PBX. Today, there is still no reporting requirement for Glass Phones to any policy authority other than the TFA gateway.

A difficulty with having both TFA and H.323 clients on the same LAN is that both types of clients use bandwidth while the H.323 gatekeeper, aware of H.323 clients use of network bandwidth, is unaware that the network's bandwidth is being reduced by any active TFA clients. That is, the H.323 gatekeeper provides a mechanism for enforcing calls for the ToL clients on a policy basis, but TFA clients can normally place calls without regard to this policy. Therefore, the H.323 gatekeeper may unknowingly oversubscribe the network by accepting call reservations beyond the available bandwidth. The H.323 gatekeeper provides a mechanism for enforcing policy-based calls for the ToL clients, but TFA clients can normally place calls without regard to this policy. Leaving the H.323 gatekeeper without information on TFA client use of bandwidth may result in improper bandwidth allocation and in sub-standard or no telephony service over the LAN for some users.

SUMMARY OF THE INVENTION

These problems in the prior art are overcome in large part by a system and methods according to the present invention. In particular, a combined ToL/PBX system is provided whereby a single policy may be enforced for both TFA and ToL users by making the H.323 gatekeeper aware of those TFA connections so as to accurately allocate the remaining available bandwidth. According to one embodiment of the invention, the ToL gatekeeper is at least notified whenever a TFA call is being made or received. In another embodiment, the ToL gatekeeper interacts with the Glass Phone software or with the TFA gateway in the PBX to allow a requested call based on bandwidth sufficiency.

These and other specific embodiments are described in detail below in conjunction with the following drawings.

BRIEF DESCRIPTION OF THE DRAWINGS

FIG. 6 is a flowchart illustrating call request setup according to an alternate embodiment of the present invention;

DETAILED DESCRIPTION OF SPECIFIC EMBODIMENTS OF THE INVENTION

Figure 1:
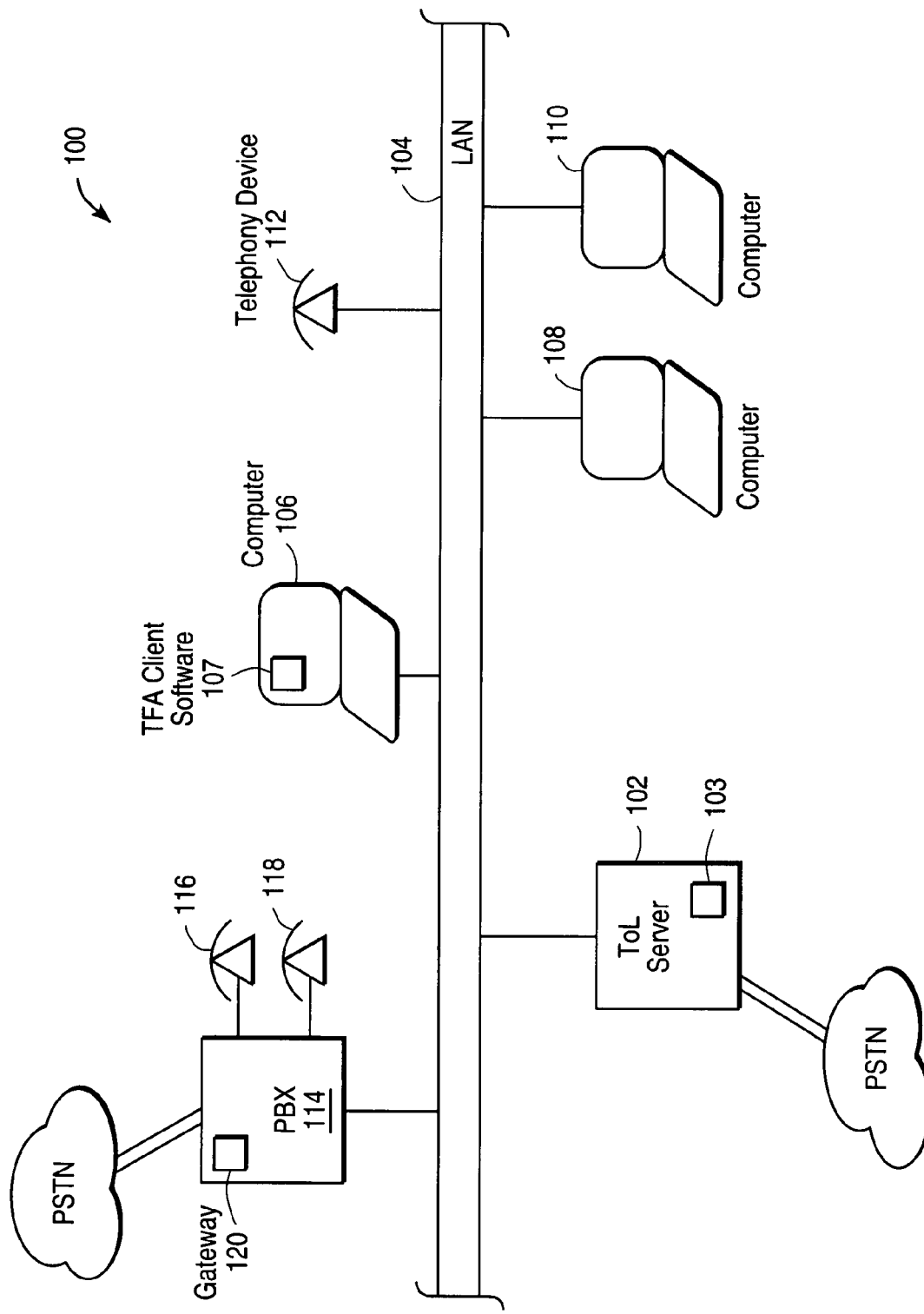
FIG. 1 is a diagram illustrating a combined ToL/PBX system according to an embodiment of the present invention.

FIG. 1 is a diagram illustrating a combined ToL/PBX system 100 according to an embodiment of the present invention. In particular, the combined ToL/PBX system 100 includes a local area network 104. A ToL server 102 and a PBX 114 are coupled to the LAN 104. The ToL server 102 performs switching and control functions and traditional LAN server functions. Also coupled to the local area network 104 may be one or more computers 106, 108, 110 and one or more telephony devices 112. The telephony device 112 may be an H.323 telephone and the computers 108, 110 may include expansion boards for communicating using the H.323 standard over the LAN 104. In addition, the computer 106 may be a TFA-compatible computer. Thus, computer 106 may include "Glass Phone" or TFA client software 107 to provide a user interface for telephony applications, though call processing functions are carried out by the PBX 114 instead of the ToL server 102. PBX 114 includes a telephony feature access (TFA) control unit or gateway 120 according to the present invention. As will be discussed in greater detail below, PBX 114 also interfaces with known telephones 116, 118, which may be digital or analog telephones or other telephony devices such as fax machines and the like. Both PBX 114 and ToL server 102 provide interconnection to a circuit switched network such as the public switched telephone network or ISDN network.

Figure 2:
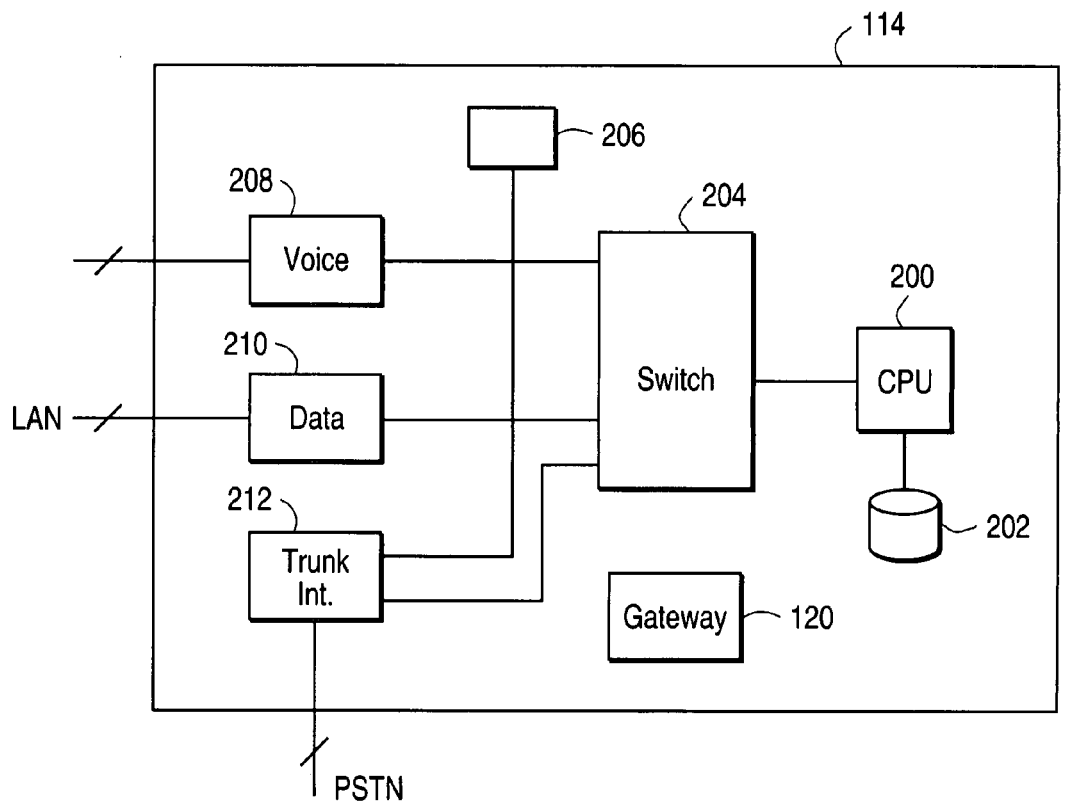
FIG. 2 is a block diagram illustrating a PBX according to an embodiment of the present invention.

FIG. 2 is a block diagram illustrating a PBX 114 according to an embodiment of the present invention. In particular, the PBX 114 includes a switching unit 204 controlled by a central processing unit 200, which is coupled to a memory 202. The switching unit 204, in turn, is coupled to a voice interface 208, a data interface 210 and a trunk interface 212. The voice interface 208 interfaces the switching unit 204 to internal voice lines and telephony devices such as telephones 116, 118 (FIG. 1). The data interface 210 interfaces the switching unit 204 with the local area network 104 (FIG. 1). The trunk interface 212 interfaces to the public switched telephone network or the ISDN network. A line scanner 206 monitors the voice and data lines, as well as the trunk interface for activity in a known manner. Also included in the PBX 114 is a TFA gateway 120 according to the present invention. The TFA gateway 120 is coupled, as will be described in greater detail below, to receive telephony requests from the Glass Phone computer 106 and interface to the public switched telephone network. The TFA gateway 120 is further configured to communicate with the gatekeeper 103 of the ToL server 102.

Figure 3:
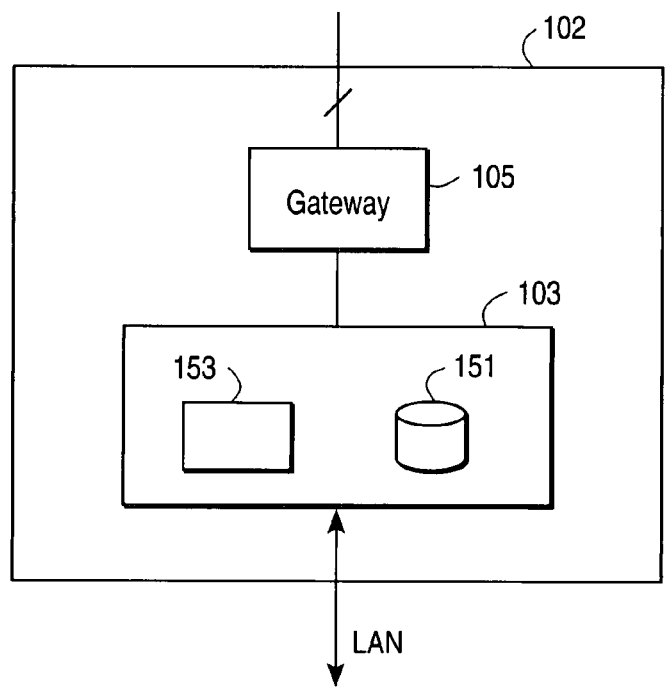
FIG. 3 is a block diagram illustrating a ToL gatekeeper according to an embodiment of the present invention.

In accordance with an embodiment of the present invention, FIG. 3 is a diagram of the ToL server 102 shown in greater detail. In particular, the ToL server 102 may include an H.323 gatekeeper 103, which includes a control unit 153 and a memory unit 151, and an H.323 gateway 105. As is known, the gateway 105 provides a translation function between H.323 conferencing and other non-H.323 terminal types, including translation between transmission formats and communications procedures. The gateway 105 also translates between audio and video codecs and performs call setup and clearing on both the LAN side and the circuit switched network side. The H.323 gatekeeper 103 acts as the central point for calls and provides call control services such as address translation from LAN aliases for terminals and gateways to IP or IPX addresses (as defined in the RAS specification), as well as bandwidth management which is also designated within RAS. The H.323 gatekeeper 103 thus can refuse to make any more connections once a threshold number of simultaneous conferences on LAN 104 is met. The effect is to limit the total conferencing bandwidth to some fraction of the total bandwidth available. In particular, according to the present invention, the H.323 gatekeeper 103 can send and receive bandwidth availability messages to and from the TFA interface and/or client software on the Glass Phone or TFA client computer as will be discussed in greater detail below.

Figure 4:
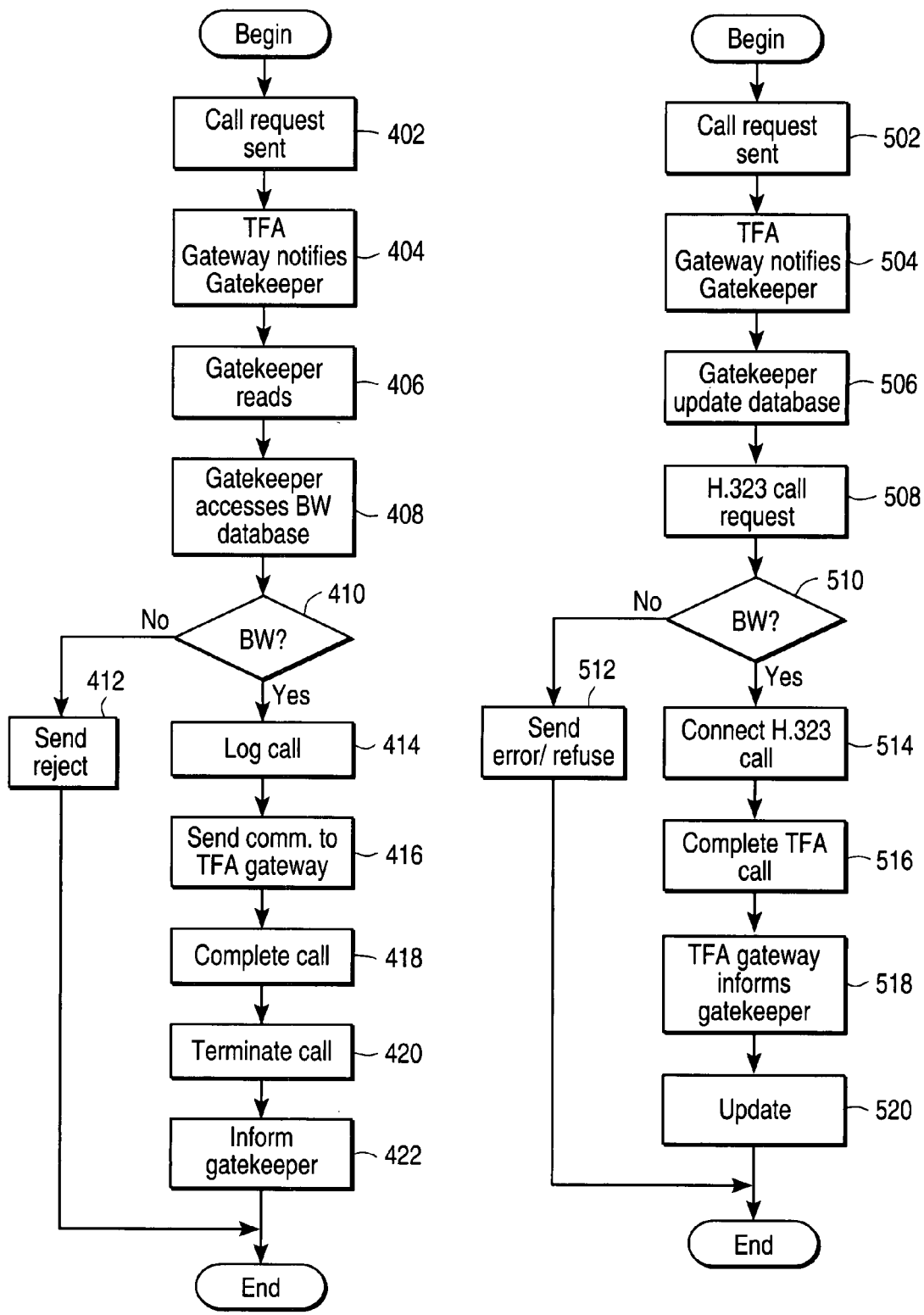
FIG. 4 is a flowchart illustrating call request operation according to an embodiment of the present invention.

According to a specific embodiment of the invention, when a TFA client 107 sends a call request to the TFA gateway 120, the TFA gateway 120 notifies the gatekeeper 103 of the call request. The gatekeeper 103 then determines whether bandwidth is available for the call. If it is, the call goes through. If not, the gatekeeper 103 informs the TFA gateway 120 that the call is refused. The TFA gateway 120 then provides, for example, a fast busy tone to the TFA client 107. Turning now to FIG. 4, a flowchart 400 illustrating call setup procedures according to this embodiment of the present invention is illustrated. Call procedures are also illustrated schematically in FIG. 5. In the embodiment illustrated, call setup bandwidth communications take place between the H.323 gatekeeper 103 and the TFA gateway 120.

Figure 5:
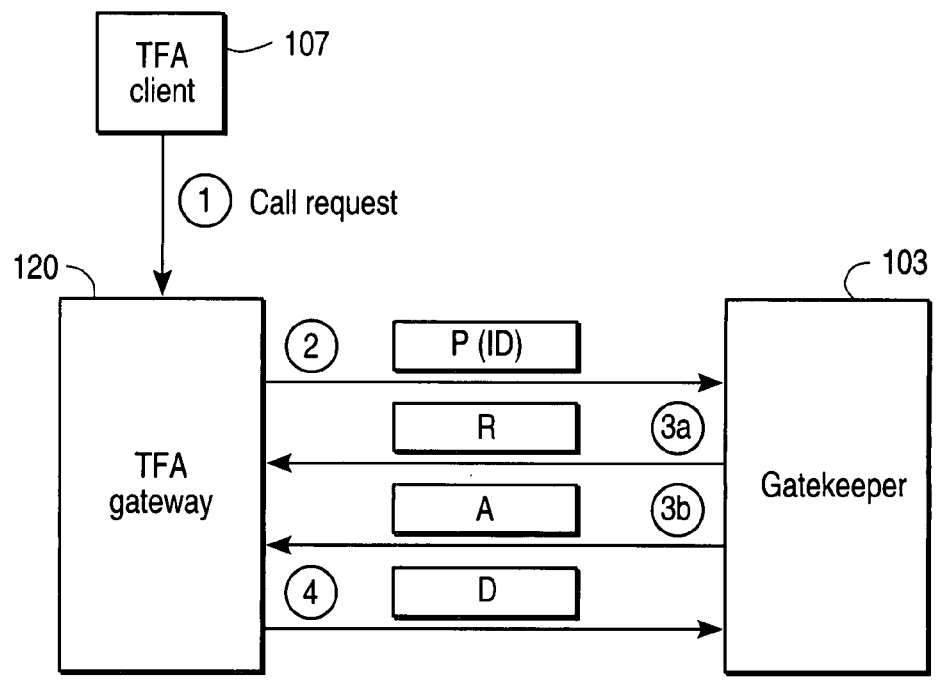
FIG. 5 is a diagram illustrating call flow according to the embodiment of FIG. 4.

As seen in FIGS. 4 and 5, in a step 402 a call request is sent by the Glass Phone or TFA client software 107 of the computer 106. The call request is sent via the LAN 104 to the PBX 114, and in particular, is received by the TFA gateway 120. In step 404, the TFA gateway 120 sends a message via the LAN 104 to the gatekeeper 103 of the ToL server 102. Generally, the call request may be a protocol element P (FIG. 5) and may include the identity of the caller and its class of service. This message may take the form of an admission request (ARQ) message according to the H.323 standard (The ARQ message may also include an identification indicating that a TFA client has made the request). In a step 406, the gatekeeper 103 reads the P (or ARQ) message, including identity and class of service. In a step 408, the gatekeeper 103 accesses a bandwidth database (e.g., stored in the memory 151) (FIG. 3) to determine the priority of the call based on the class of service. Generally, if the bandwidth is available, the gatekeeper 103 will log the call in its list of active calls and respond to the TFA gateway 120 with an admission confirm (ACF) message (or a more general acknowledgement message A (FIG. 5). If the bandwidth is not available, the gatekeeper 103 will respond with an admission reject (ARJ) message to the TFA gateway 120. Thus, in a step 410, the gatekeeper 103 accesses the database in memory 151 to determine whether the bandwidth is available. In a step 412, if bandwidth is not available, the gatekeeper 103 issues the ARJ or reject message to the TFA gateway 120, which provides a corresponding signal to the TFA user. If, however, the bandwidth is available, then in a step 414, the gatekeeper 103 will log the call (including bandwidth expected to be used). In a step 416, the gatekeeper 103 then sends the ACF (or acknowledge A in FIG. 5) message to the TFA gateway 120. In a step 418, the call is completed in the normal fashion, and in a step 420 the call may be terminated by either the caller or the called party. When the call is terminated, the TFA client 120 in step 422 will send a termination message D (or disengage request (DRQ) message) to inform the gatekeeper 103 that the call is being terminated and bandwidth is available. (Similarly, the TFA gateway 120 will provide the termination message D to the gatekeeper 103 if the call is unable to be completed on the PBX side).

Figure 7:
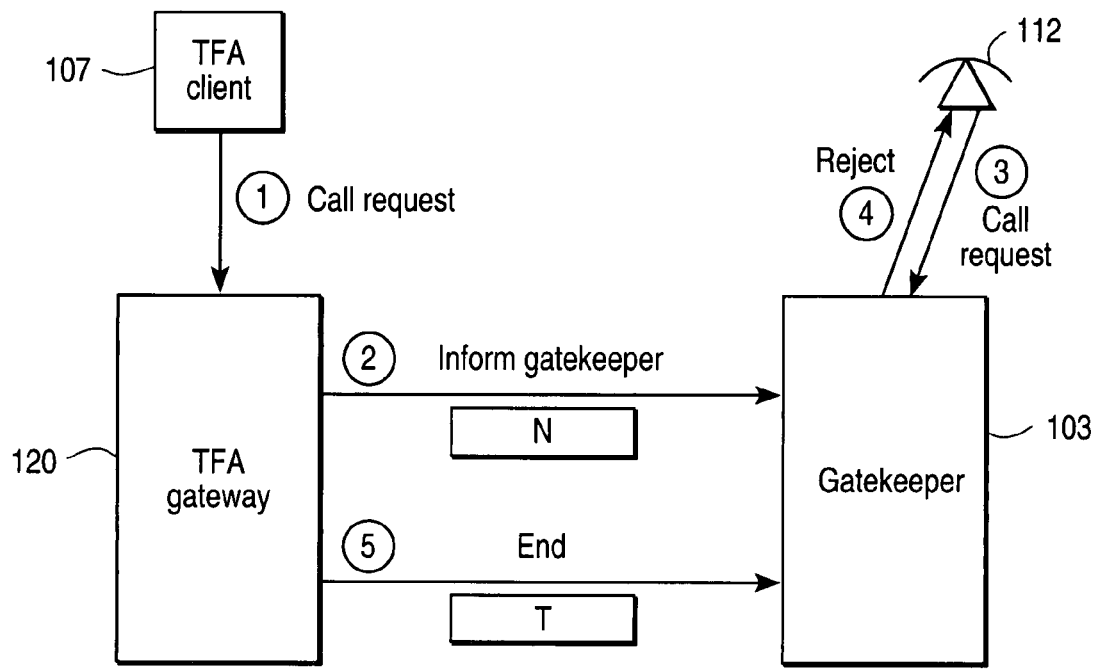
FIG. 7 is a diagram illustrating call flow according to the embodiment of FIG. 6.

In an alternate embodiment, the TFA client 107 directly informs the gatekeeper 103 of the call, but for simplicity, the gatekeeper 103 is not permitted to reject the TFA client call. This embodiment is illustrated in FIGS. 6 and 7.

In particular, a flowchart illustrating this embodiment of the present invention is shown in FIG. 6. FIG. 7 illustrates schematically the call procedures of FIG. 6. In a step 502, the computer 106's Glass Phone or TFA client software 107 of computer 106 sends a call request over the LAN 104 to the TFA gateway 120 (FIG. 7). Immediately thereafter (step 504), the TFA gateway 120 notifies the gatekeeper 103 via a message N (FIG. 7) that a TFA call is being made and will be occupying LAN bandwidth. This N message may take the form, for example, of a standard control message which identifies the call as originating from a TFA client user. In a step 506, the gatekeeper 103 updates its bandwidth calculation and determination, but in this embodiment does not abort the TFA telephone call. However, for subsequent H.323 call requests the gatekeeper 103 will be able to take into account the bandwidth requirement of the call made by the Glass Phone or TFA client software 107 in the determination of the available bandwidth for other calls.

For example, in a step 508, an H.323 client 112 attempts to make a call. The gatekeeper 103 accesses its bandwidth database to determine if bandwidth is available (step 510). If bandwidth is determined to be available in view of the TFA call as well as other calls that may be occurring, the requested H.323 call is connected (step 514); and the bandwidth database is updated by gatekeeper 103 to account for the H.323 call bandwidth requirement. If in step 510 sufficient bandwidth is not available for the H.323 call, then an error or reject message is sent by gatekeeper 103 to H.323 client 112. Next, when in a step 516 the TFA client 107's call is completed and then terminated by either the calling or called party, in a step 518 the TFA gateway 120 sends a termination message T to the gatekeeper 103. In a step 520, the gatekeeper 103 updates its bandwidth database accordingly to indicate the termination of the TFA call and the availability of the bandwidth used by the now-terminated TFA call.

In the embodiments discussed above (FIGS. 4-7), the TFA client 120 is unaware of the H.323 call processing procedures. Another approach, however, is for the TFA client 120 to be H.323 capable, but still receive call processing features/functions from the PBX. Thus, in such an alternate embodiment, the TFA client 107 informs the gatekeeper 103 of the call, and the gatekeeper 103 can send a message to the TFA gateway 120 to abort the call. This embodiment is illustrated in FIGS. 8 and 9.

Figure 8:
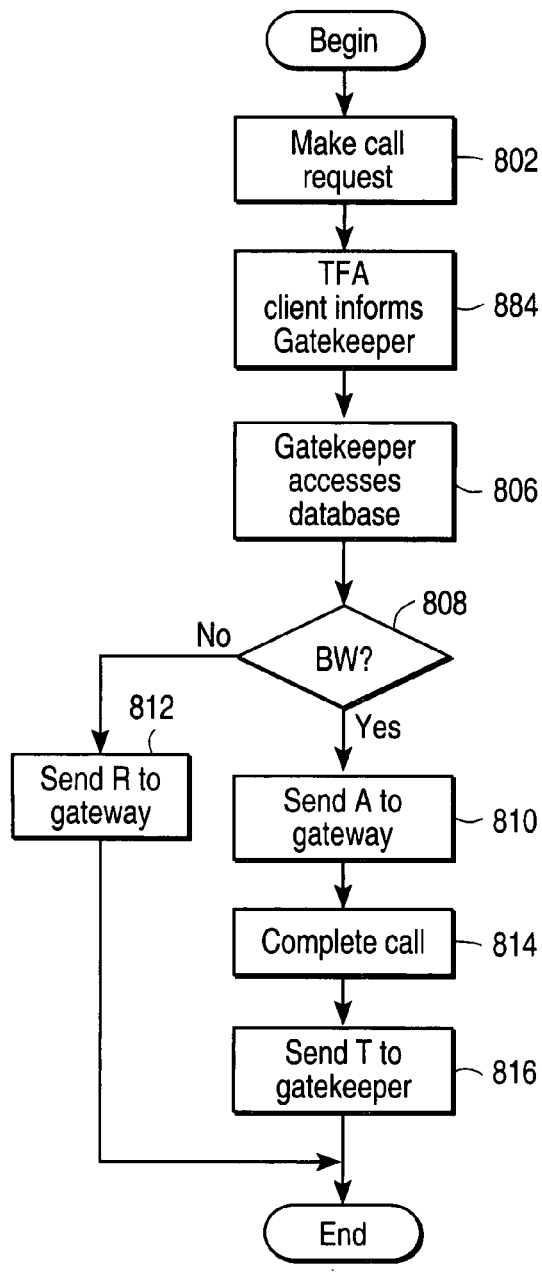
FIG. 8 is a flowchart illustrating call request setup according to another embodiment of the present invention.
Figure 9:
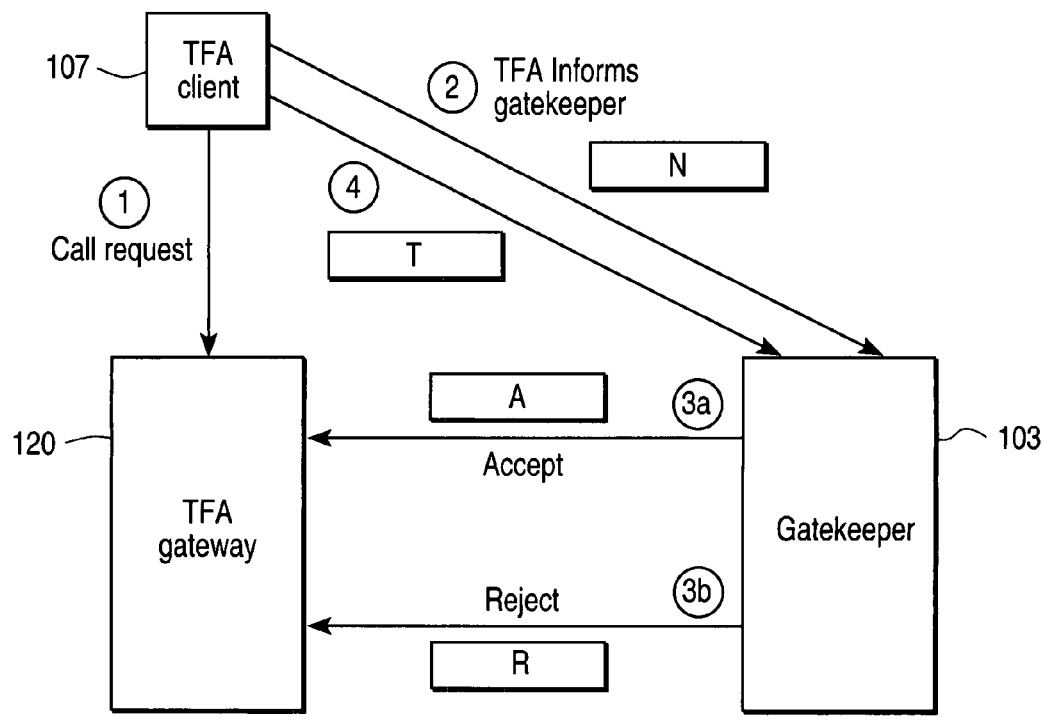
FIG. 9 is a diagram illustrating call flow according to the embodiment of FIG. 8.

In particular, as shown in FIG. 8, a call request from the TFA client 107 is made to the TFA gateway 120 (FIG. 9) in step 802. In a step 804, the TFA client 107 also informs the gatekeeper 103, for example, by providing a protocol element N (e.g., an ARQ message) to the gatekeeper 103. In response, in a step 806, the gatekeeper 103 accesses its database 151 to determine whether the call is allowable. In a step 808, the gatekeeper 103 determines whether to allow the call based on bandwidth availability. If the gatekeeper 103 determines that the call is allowable, then in a step 810 a message A (such as an ACF message) is provided to the TFA gateway 120, and gatekeeper 103 logs the call and bandwidth requirements in its database. The TFA gateway 120 then completes the call in a step 814. Once the call is completed and then terminated by either the calling or called party, in a step 814 the TFA client 107 sends a termination message T (e.g., DRQ) to the gatekeeper 103 (step 816). Gatekeeper 103 then updates its database 151 to account for the call termination. If, however, in step 808 bandwidth was determined not to be available, in a step 812 the gatekeeper 103 sends a reject message R (e.g., ARJ) to the TFA gateway 120. The TFA gateway 120 then provides, for example, an error signal to the TFA client 107.

According to yet another alternate embodiment, in which the TFA client 107 may be H.323 compatible, the TFA client 107 sends call requests initially to the gatekeeper 103. The gatekeeper 103 then determines whether or not the call can be connected based on the available bandwidth. If the call can be connected, gatekeeper 103 sends a message to the TFA client 107. The TFA client 107 is then free to make a call request to the TFA gateway 120. Once the call is completed, the TFA client 107 sends a message to the gatekeeper 103 so that the gatekeeper can update its database. This embodiment is shown in FIGS. 10 and 11.

Figure 10:
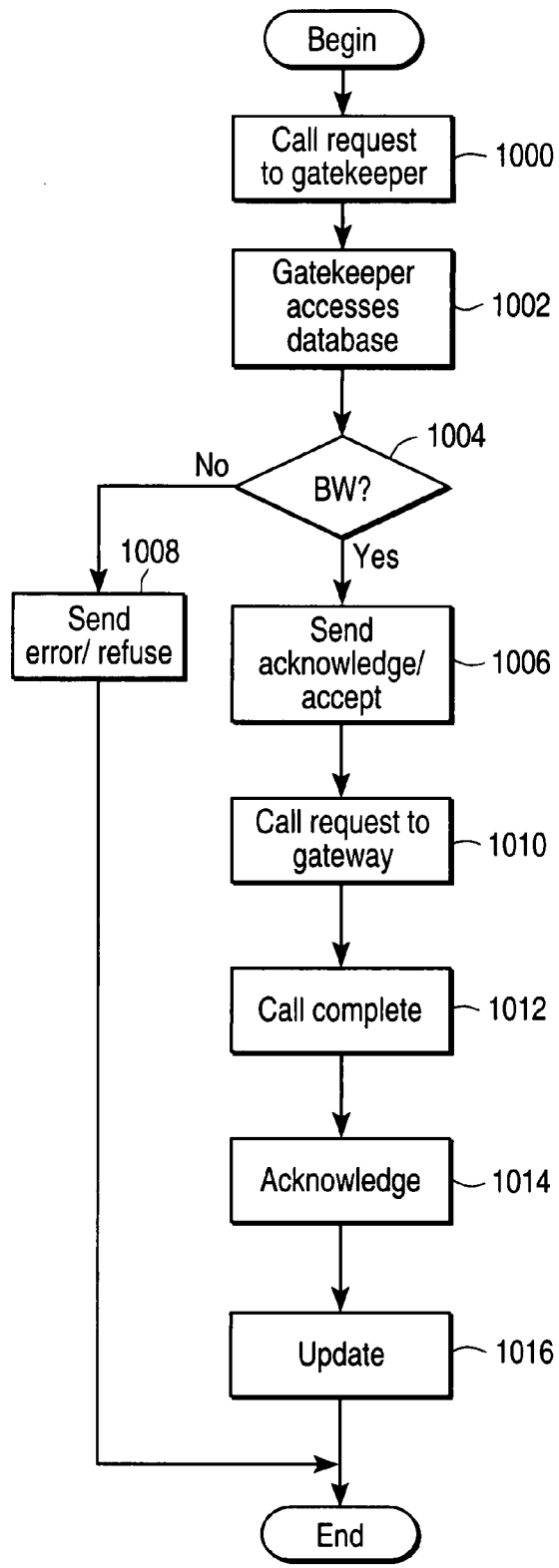
FIG. 10 is a flowchart illustrating call setup according to yet another embodiment of the present invention.
Figure 11:
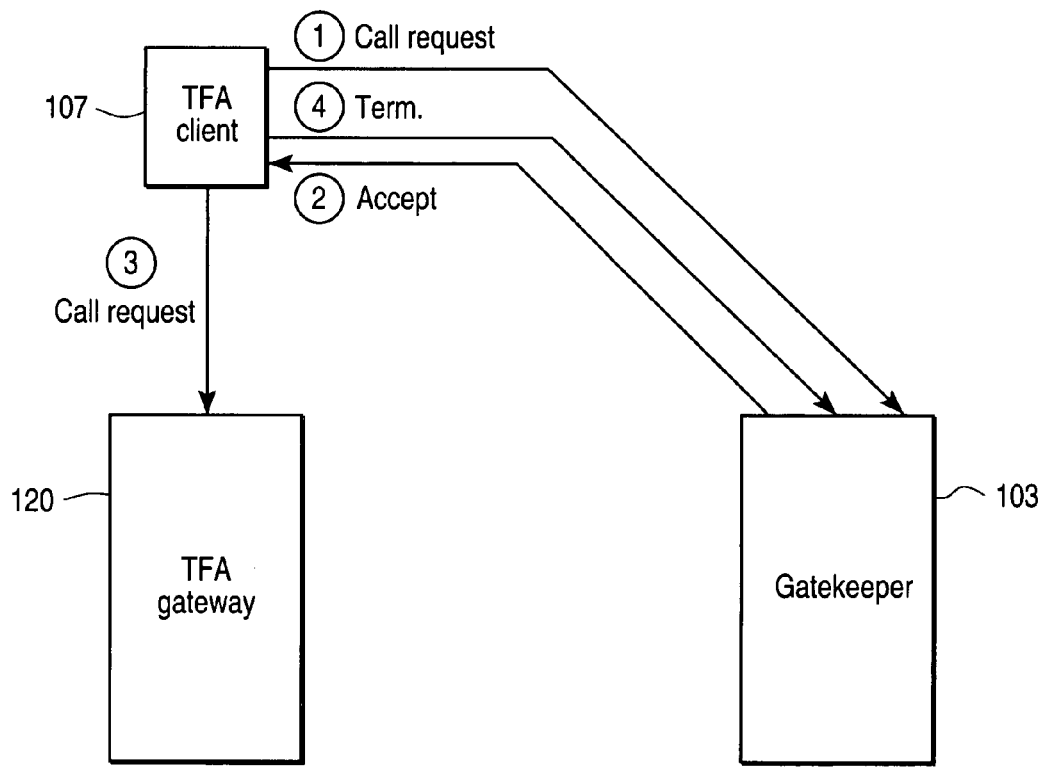
FIG. 11 is a diagram illustrating call flow according to the embodiment of FIG. 10.

In particular, as shown in FIG. 10, in a step 1000 the TFA client 107 sends a call request to the gatekeeper 103. The call request may be a standard H.323 request or another protocol element which identifies the TFA client 107 as a TFA client. In a step 1002, the gatekeeper 103 accesses its database 151 to determine whether the call can be completed based on the available bandwidth. In a step 1004, the gatekeeper 103 makes the bandwidth determination. If sufficient bandwidth is available, then in a step 1006, the gatekeeper 103 sends an ACCEPT message to the TFA client 107. The TFA client 107 then makes a call request to the TFA gateway 120 in a step 1010. In a step 1012, the call is completed in the standard fashion. Once the call is completed, the TFA client 107 then provides an acknowledgement message to the gatekeeper 103. In a step 1016, the gatekeeper 103 then updates its database to account for the TFA call and its bandwidth requirements. Once the TFA call is terminated, the TFA client 107 sends a termination message T to gatekeeper 103 in step 1018, and gatekeeper 103 updates the call and bandwidth information in its database to account for the termination of the TFA call. If, in step 1004, bandwidth is determined to be unavailable, then gatekeeper 103 sends an error or reject message to TFA client 107 in step 1008.

What is claimed is:

1. A telecommunications system, comprising:
a private branch exchange (PBX) coupled to a local area network (LAN), said PBX including a telephony feature access (TFA) gateway;
a server coupled to said local area network, said server configured to provide call processing via said LAN and configured to monitor bandwidth usage of calls it has processed on said LAN;
one or more first telephony devices of a first type operably coupled to said TFA gateway, said TFA gateway configured to provide for call processing for said one or more first telephony devices of said first type of calls on said LAN;
one or more second telephony devices of a second type operably coupled to said server, said server configured to provide for call processing for said one or more second telephony devices of said second type of calls on said LAN; and
means associated with said server for accounting for bandwidth requirements of said one or more first telephony devices of said first type operably coupled to said TFA gateway on said LAN and for calls for which said server has not performed said call processing when processing calls for said one or more second telephony devices of said second type.

2. The telecommunications system according to claim 1, said server being an H.323 compatible server.

3. The telecommunications system according to claim 1, said accounting means including means associated with said server for aborting a call being processed by said PBX.

4. The telecommunications system according to claim 1, said accounting means including means for preventing a call being processed by said server on said LAN.

5. The telecommunications system according to claim 2, wherein said one or more second telephony devices coupled to said server for call processing are able to communicate with said H.323 server.

6. A method for communicating in a system including a PBX and a telephony-over-LAN (ToL) server coupled to a LAN, said PBX adapted to process calls for telephony feature access (TFA) devices on said LAN, said ToL server adapted to process calls for ToL devices on said LAN, said method comprising:
informing said ToL server of a call setup message associated with said PBX and TFA devices;
accessing a database at said ToL server to determine if bandwidth is available on said LAN for a call involving TFA devices and processed by said PBX;
sending an abort message to abort said call if bandwidth is not available; and
said ToL server accounting for PBX user bandwidth usage for TFA devices when processing a ToL call for ToL devices; further comprising receiving said call setup message at said PBX; and wherein said abort message is sent to said PBX.

7. A method for communicating in a system including a PBX and a telephony-over-LAN (ToL) server coupled to a LAN, said PBX adapted to process calls for telephony feature access (TFA) devices on said LAN, said ToL server adapted to process calls for ToL devices on said LAN, said method comprising:

informing said ToL server of a call setup message associated with said PBX and TFA devices;

accessing a database at said ToL server to determine if bandwidth is available on said LAN for a call processed by said PBX;

sending an abort message to abort said call if bandwidth is not available; and said ToL server accounting for PBX user bandwidth usage when processing a ToL call;

receiving said call setup message at said PBX; and wherein said abort message is sent to said PBX; and further including informing said ToL server when said call processed by said PBX is completed.

8. A method for communicating in a system including a PBX and a telephony-over-LAN (ToL) server coupled to a LAN, said PBX adapted to process calls for telephony feature access (TFA) devices on said LAN, said ToL server adapted to process calls for ToL devices on said LAN, said method comprising:

informing said ToL server of a call setup message associated with said PBX and TFA devices;

accessing a database at said ToL server to determine if bandwidth is available on said LAN for a call processed by said PBX;

sending an abort message to abort said call if bandwidth is not available, said ToL server accounting for PBX user bandwidth usage when processing a ToL call;

receiving said call setup message at said PBX; and wherein said abort message is sent to said PBX;

informing said ToL server when said call processed by said PBX is completed;

including said ToL server returning an acknowledge message to said PBX when said ToL server is informed that said call is completed.

9. A method for communicating in a system including a PBX and a telephony-over-LAN (ToL) server coupled to a LAN, said method comprising:

informing said ToL server of a call setup message;

accessing a database at said ToL server to determine if bandwidth is available on said LAN for a call processed by said PBX;

sending an abort message to abort said call if bandwidth is not available;

further comprising receiving said call setup message at said PBX, wherein said abort message is sent to said PBX;

including informing said ToL server when a call processed by said PBX is completed; and including said ToL server accounting for PBX user bandwidth usage when processing a ToL call.

10. The method according to claim 9 wherein said informing step is performed by a client making said call processed by said PBX, and wherein said abort message is sent to said client.

11. The method according to claim 10 wherein said ToL server is H.323 compatible.

12. The method according to claim 6 wherein said ToL server and said ToL devices are H.323 compatible.

13. A system for processing telephone calls, comprising:

a private branch exchange (PBX) coupled to a local area network (LAN), said PBX having associated therewith a telephony feature access (TFA) gateway, said PBX and TFA gateway adapted to provide call processing for TFA telephones on said LAN;

a telephony over LAN (ToL) gatekeeper coupled to said LAN and configured to provide call control services for ToL phone calls on said LAN; and means associated with said ToL gatekeeper for monitoring bandwidth usage of telephone calls between TFA telephones for which said ToL gatekeeper has not provided call control services and processed via said TFA gateway;

wherein said ToL gatekeeper is adapted to account for PBX user bandwidth usage on said LAN when processing a ToL call between ToL telephones.

14. The system according to claim 13, said monitoring means including means for aborting a call between TFA telephones and processed via said TFA gateway if bandwidth is unavailable.

15. The system according to claim 13, said monitoring means including means for aborting at least one of said ToL phone calls if bandwidth is not available.

16. The system according to claim 13, including a TFA client that is H.323 compliant but receives call functions from said TFA gateway and PBX.

17. A system for processing telephone calls, comprising:

a private branch exchange (PBX) coupled to a local area network (LAN), said PBX having associated therewith a telephony feature access (TFA) gateway, said PBX and TFA gateway adapted to provide call processing for TFA telephones on said LAN;

a telephony over LAN (ToL) gatekeeper coupled to said LAN and configured to provide call control services for ToL phone calls on said LAN; and means associated with said ToL gatekeeper for monitoring bandwidth usage of telephone calls for which said ToL gatekeeper has not provided call control services and processed via said TFA gateway;

wherein said ToL gatekeeper is adapted to account for PBX user bandwidth usage on said LAN when processing ToL phone calls;

wherein said gatekeeper is configured to abort a ToL call but not a TFA call if bandwidth exceeds a predetermined usage.

18. The system according to claim 13, wherein a TFA client is configured to provide a call request to said gatekeeper and, if said gatekeeper determines that bandwidth is available, provide a subsequent call request to said TFA gateway.

19. The system according to claim 13, wherein a TFA client is configured to submit a call request to said TFA gateway and inform said gatekeeper of said call request.

20. A method for communicating in a system including a PBX and a telephony-over-LAN (ToL) server coupled to a LAN, said method comprising:

informing said ToL server of a call setup message for a call being handled by said PBX on said LAN;

accessing a database at said ToL server to determine bandwidth available on said LAN for said call processed by said PBX;

said ToL server accounting for PBX user bandwidth usage when processing a ToL call; and aborting a ToL call but not a telephony feature access (TFA) call if bandwidth exceeds a predetermined usage.

21. The system according to claim 17, wherein a TFA client is configured to provide a call request to said gatekeeper and, if said gatekeeper determines that bandwidth is available, provide a subsequent call request to said TFA gateway.

22. The system according to claim 17, wherein a TFA client is configured to submit a call request to said TFA gateway and inform said gatekeeper of said call request.

23. The system according to claim 17, including a TFA client that is H.323 compliant but receives call functions from said TFA gateway and PBX.

24. A telecommunications system, comprising:
a private branch exchange (PBX) coupled to a local area network (LAN), said PBX including a telephony feature access (TFA) gateway;
a server coupled to said local area network, said server configured to provide call processing via said LAN and configured to monitor bandwidth usage of calls it has processed on said LAN;
one or more telephony devices operably coupled to said TFA gateway for call processing;
one or more second telephony devices operably coupled to said server for call processing; and
means associated with said server for accounting for bandwidth requirements of said one or more telephony devices operably coupled to said TFA gateway on said LAN and for calls for which said server has not performed said call processing when processing calls for said one or more second telephony devices;
wherein said server is adapted to account for PBX user bandwidth usage on said LAN when processing telephony-over-LAN (ToL) phone calls;
wherein said server is configured to abort a ToL call but not a TFA call if bandwidth exceeds a predetermined usage.

25. A method for communicating in a system including a PBX and a telephony-over-LAN (ToL) server coupled to a LAN, said PBX adapted to process calls for telephony feature access (TFA) devices on said LAN, said ToL server adapted to process calls for ToL devices on said LAN, said method comprising:
informing said ToL server of a call setup message associated with said PBX and TFA devices;
accessing a database at said ToL server to determine if bandwidth is available on said LAN for a call processed by said PBX;
sending an abort message to abort said call if bandwidth is not available;
said ToL server accounting for PBX user bandwidth usage when processing a ToL call; and
aborting a ToL call but not a TFA call if bandwidth exceeds a predetermined usage.

26. The method according to claim 25, further comprising receiving said call setup message at said PBX; and wherein said abort message is sent to said PBX.

27. The method according to claim 26, including informing said ToL server when said call processed by said PBX is completed.

28. The method according to claim 27, including said ToL server returning an acknowledge message to said PBX when said ToL server is informed that said call is completed.

29. A method for communicating in a system including a PBX and a telephony-over-LAN (ToL) server coupled to a LAN, said method comprising:
informing said ToL server of a call setup message;
accessing a database at said ToL server to determine if bandwidth is available on said LAN for a call processed by said PBX;
sending an abort message to abort said call if bandwidth is not available;
further comprising receiving said call setup message at said PBX, wherein said abort message is sent to said PBX;
including informing said ToL server when a call processed by said PBX is completed; and
including said ToL server accounting for PBX user bandwidth usage when processing a ToL call.

30. The method according to claim 29 wherein said informing is performed by a client making said call processed by said PBX, and wherein said abort message is sent to said client.

31. The method according to claim 30 wherein said ToL server is H.323 compatible.

32. A system including a PBX and a telephony-over-LAN (ToL) server coupled to a LAN, comprising:
means for informing said ToL server of a call setup message for a call being handled by said PBX on said LAN;
means for accessing a database at said ToL server to determine bandwidth available on said LAN for said call processed by said PBX;
said ToL server accounting for PBX user bandwidth usage when processing a ToL call; and
means for aborting a ToL call but not a telephony feature access (TFA) call if bandwidth exceeds a predetermined usage.

* * * * *